(12) United States Patent
Yarussi et al.

(10) Patent No.: US 6,665,070 B1
(45) Date of Patent: Dec. 16, 2003

(54) ALIGNMENT OF A ROTATABLE POLARIZER WITH A SAMPLE

(75) Inventors: Richard A. Yarussi, San Francisco, CA (US); Pablo I. Rovira, San Francisco, CA (US)

(73) Assignee: Nanometrics Incorporated, Milpitas, CA (US)

( * ) Notice: Subject to any disclaimer, the term of this patent is extended or adjusted under 35 U.S.C. 154(b) by 328 days.

(21) Appl. No.: 09/878,069

(22) Filed: Jun. 7, 2001

Related U.S. Application Data

(63) Continuation of application No. 09/839,898, filed on Apr. 20, 2001, now abandoned.

(51) Int. Cl.[7] .................... G01J 3/447; G01J 3/28; H01J 40/14
(52) U.S. Cl. ............... 356/369; 356/364; 356/327; 356/328; 250/225
(58) Field of Search .................. 356/364, 369, 356/326–334; 250/225

(56) References Cited

U.S. PATENT DOCUMENTS

| | | | |
|---|---|---|---|
| 4,153,367 A | 5/1979 | Lietar et al. | ................ 356/400 |
| 5,206,706 A | 4/1993 | Quinn | ........................ 356/400 |
| 5,337,146 A * | 8/1994 | Azzam | ........................ 356/369 |

* cited by examiner

Primary Examiner—Zandra V. Smith
(74) Attorney, Agent, or Firm—Silicon Valley Patent Group LLP

(57) ABSTRACT

A metrology device with a rotatable polarizer is calibrated to align the transmission axis of the polarizer with the axis of orientation of a sample, such as a diffraction grating. The axis of orientation of the diffraction grating can be either the TE or TM axis. The system offset angle between the transmission axis of the polarizer in its home position and an axis of motion of the stage, such as a polar coordinate stage, is determined. Whenever a new substrate is loaded onto the stage, the sample offset angle between the axis of motion of the stage and the axis of orientation of a sample is measured. The polarizer offset angle, which is the angle between transmission axis of the polarizer and the axis of orientation of the sample, is the sum of the system offset angle and the sample offset angle. Thus, by rotating the polarizer by an amount equivalent to the sum of the system offset angle and the sample offset angle, the polarizer offset angle is reduced to zero. If desired, the polarizer may be rotated once to compensate for the system offset angle and then rotated to compensate for the sample offset angle for each newly loaded substrate or the polarizer may be rotated to compensate for both the system offset angle and the sample offset angle for each newly loaded substrate.

27 Claims, 5 Drawing Sheets

ALIGNMENT OF A ROTATABLE POLARIZER WITH A SAMPLE

CROSS REFERENCE TO RELATED APPLICATION

This application is a continuation of U.S. patent application Ser. No. 09/839,898, filed Apr. 20, 2001 now abandoned, entitled "Alignment Of A Rotatable Polarizer With A Sample".

FIELD OF THE INVENTION

The present invention relates in general to calibration and alignment of a metrology device and, in particular, to aligning the transmission axis of a polarizer with a sample, such as a diffraction grating.

BACKGROUND

It is desirable to measure circuit structures and other types of structures, e.g., resist structures, during the production of integrated circuits. Optical metrology tools are particularly well suited for measuring microelectronic structures because they are nondestructive, accurate, repeatable, fast, and inexpensive. Often different metrology tools are required to measure different structures or parameters on a wafer. For example, certain structures on a wafer act as diffraction gratings, which conventionally require a different metrology tool, e.g. critical dimension-scanning electron microscopy (CD-SEM), than is used to measure planar thin films.

One particularly useful instrument to characterize the critical dimensions (CDs) of a diffraction grating, or other microcircuit structures, is a normal incidence polarized reflectance spectrometer, such as that described in the U.S. Patent Application entitled "Apparatus and Method for the Measurement of Diffracting Structures," by J. Holden, W. McGahan, R. Yarussi, P. Rovira, and R. Lowe-Web, filed Sep. 25, 2000, having Ser. No. 09/670,000, having the same assignee as the present disclosure, and which is incorporated herein by reference. Among many advantages of this tool are the relatively easy calibration and alignment procedures compared to other types of metrology devices, as well as the adaptation to a polar coordinate, i.e., R-Θ, stage, which is particularly suitable for integrated metrology. Because the measurements are at normal incidence, the polarizer can be aligned either perpendicular or parallel to the lines of the grating structure, i.e., the TM or TE axes, which speeds up the modeling of the reflectance spectrum because only one component (either $R_{TM}$ or $R_{TE}$) needs to be calculated.

To achieve accurate results with the normal incidence polarized reflectance spectrometer, a calibration and alignment procedure is used to precisely align the polarizer transmission axis with the lines of the diffraction structure. A methodology for this alignment process is based on a Jones vector formalism to obtain the reflectance as a function of the polarizer angle with respect to the lines of the grating structure. Defining the plane parallel to the lines of the grating, i.e., TE, as a reference, the following equation is obtained:

$$R(P) = R_{TE} \cdot \cos^4(P - P_S) + R_{TM} \cdot \sin^4(P - P_S) + \\ 2 \cdot \sqrt{R_{TE} \cdot R_{TM}} \cdot \cos(\Delta) \cdot \sin^2(P - P_S) \cdot \cos^2(P - P_S). \qquad \text{eq. 1}$$

In equation 1, P is the angle between the polarizer transmission axis and the polarizer's home position, $P_S$ is the polarizer offset angle between the polarizer transmission axis and the lines of the diffraction grating, and $\Delta$ is the phase difference between the reflected fields in the TE and TM directions, i.e., parallel to and perpendicular to the lines of the diffraction grating.

Using equation 1, one of the proposed methods used to precisely align the polarizer transmission axis with the lines of the diffraction structure in Ser. No. 09/670,000 was to measure several R(P) spectra collected at different polarizer angles, e.g., ranging from 0 to 180 degrees, and obtain $R_{TE}$, $R_{TM}$, $\cos(\alpha)$ and $P_S$ in a fitting routine or a Fourier transform approach. A simulation of R(P) for a given wavelength as a function of the angle between the polarizer transmission axis and the polarizer's home position is shown in FIG. 8, by way of example. Consequently, the polarizer offset angle $P_S$ can be determined and the polarizer aligned with the lines of the diffraction grating by rotating the polarizer to either $P_S$ or $P_S \pm 90$ degrees to obtain $R_{TE\ or\ RTM}$ spectra, respectively. The alignment process, i.e., measuring R(P), fitting the measured R(P) to equation 1, determining the polarizer offset angle $P_S$, and rotating the polarizer by $P_S$ or $P_S \pm 90$ degrees must be performed for each substrate that is loaded onto the spectrometer. While one of the main advantages of normal incidence polarized reflectance is speed with which the modeled data can be calculated (because only one of either $R_{TE}$ or $R_{Tm}$ spectra need be collected), the total measurement speed of the system is reduced because of the time consuming alignment process required for each new substrate.

In addition, other metrology devices, such as ellipsometers with rotatable polarizers, may be used to measure diffraction gratings. It is desirable to align or know the angle between the polarizer transmission axis of an ellipsometer with the lines of the diffraction grating to be measured.

Therefore, an efficient calibration and alignment procedure to determine and compensate for the polarizer offset angle $P_S$ is desirable.

SUMMARY

A metrology device is calibrated to compensate for the polarizer offset angle $P_S$, in accordance with the present invention, by first determining a system offset angle, defined as the angle between the transmission axis of the polarizer in its home position and an axis of motion of the stage that holds the substrate. The system offset angle is a constant for the metrology device, and therefore needs to be determined only once. For each substrate loaded into the metrology device, the sample offset angle is measured. The sample offset angle is defined as the angle between the axis of motion of the stage and the axis of orientation of the sample. The sample, may be, e.g., a diffraction grating, and the axis of orientation can be the TE or TM axes. The polarizer offset angle $P_S$ is equal to the system offset angle and the sample offset angle. Thus, to align the polarizer with the sample, the polarizer offset angle $P_S$ is reduced to zero by rotating the polarizer by an amount equivalent to the sum of the system offset angle and the sample offset angle. If desired, the polarizer may be rotated at separate times to compensate for the system offset angle and the sample offset angle. For example, the polarizer can be rotated to compensate for the system offset angle during an initial calibration and, thus, the polarizer's home position to be aligned with the axis of motion of the stage. The polarizer can then be rotated-to compensate for the sample offset angle for each newly loaded substrate after the sample offset angle is measured for the newly loaded substrate. In another embodiment, the polarizer is rotated to compensate for the sum of the system offset angle and the sample offset angle for each newly loaded substrate. The polarizer is aligned with other samples on the same substrate by rotating the polarizer by the same angle that the stage is rotated to position the new sample for measurement.

DETAILED DESCRIPTION

In accordance with an aspect of the invention, an alignment and calibration method for a metrology device includes determining a system offset angle, which is the angle between the transmission axis of a polarizer when the polarizer is in its home position and the axis of motion of the stage and measuring a sample offset angle between an axis of the sample and the axis of motion of the stage. The polarizer offset angle $P_S$, which is the angle between the transmission axis of the polarizer and the axis of orientation of the sample, which is defined by the system offset angle and sample offset angle, can thus be determined. The polarizer can then be rotated to compensate for the polarizer offset angle.

The alignment procedure of the present invention permits the metrology tool to compensate for any skew between the transmission axis of the polarizer and axis of the sample without necessitating the time consuming actual measurement of the polarizer offset angle. Moreover, for each new substrate loaded into the system, only the sample offset angle between the axis of the stage and the axis of the new sample need be measured to determine the new polarizer offset angle $P_S$. The metrology tool synchronizes the rotation of the polarizer transmission axis with the rotation of the stage so that the polarizer is aligned with a sample at any location on a substrate.

Figure 1:
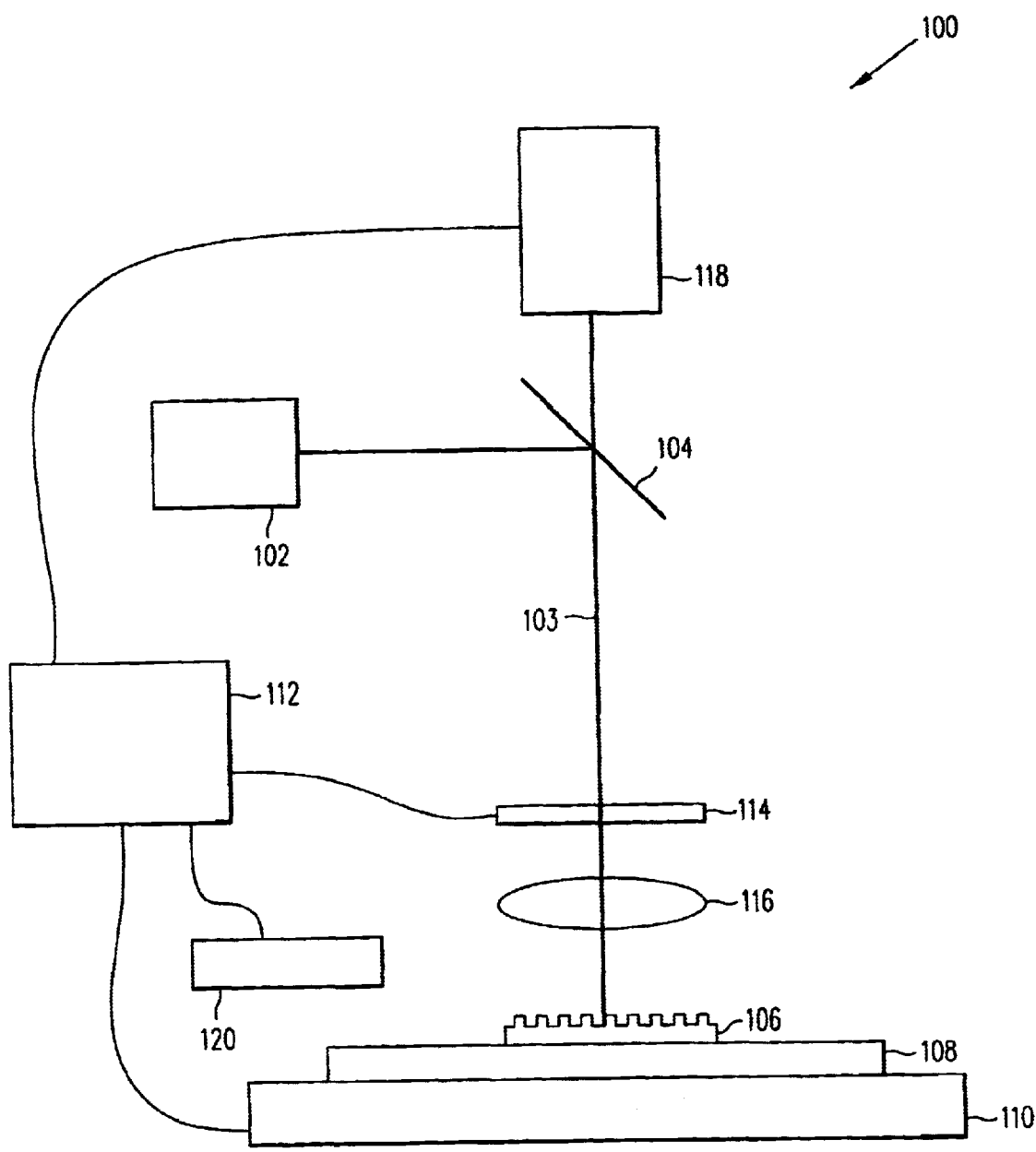
FIG. 1 is a block diagram showing a normal incidence polarized reflectance spectrometer, that may calibrated and aligned in accordance with the present invention.

FIG. 1 is a block diagram showing a normal incidence polarized reflectance spectrometer 100, that the present invention may be used to calibrate and align. Spectrometer 100 measures at normal incidence the sample reflectivity when the polarized electric field of the impinging electromagnetic wave is either parallel (TE mode) or perpendicular (TM mode) with the lines of the measured diffraction grating structure. Spectrometer 100 is similar to the device discussed in detail in the U.S. Patent Application entitled "Apparatus and Method for the Measurement of Diffracting Structures," filed Sep. 25, 2000, having Ser. No. 09/670,000, which is incorporated herein by reference.

As shown in FIG. 1, spectrometer 100 includes a polychromatic light source 102 that generates a light beam that is partially reflected by beam splitter 104 along the optical axis 103. The light beam is directed towards the sample to be measured, which is a diffraction grating 106 on a substrate 108. Substrate 108 may be, e.g., a semiconductor wafer or flat panel display or any other substrate having a diffraction grating that is to be measured. Spectrometer 100 includes a rotatable polarizer 114 and a lens 116 (or series of lenses) to polarize and focus the light beam onto the diffraction grating 106 at normal incidence. The beam is reflected off diffraction grating 106 and the reflected light is transmitted through lens 116 and polarizer 114. A portion of the reflected light is transmitted through beam splitter 104 and is received by a spectrophotometer 118. Spectrophotometer 118 is coupled to processor 112, which analyzes the data provided by spectrophotometer 118.

As shown in FIG. 1, spectrometer 100 is advantageously combined with a polar coordinate, i.e., R-Θ), stage 110 that holds and positions substrate 108 so that diffraction grating 106 is aligned with the optical axis 103 of spectrometer 100.

Spectrometer 100 also includes an edge detector 120 to determine the position and orientation of substrate 108. For the pre-alignment procedure, a light source (not shown) below substrate 108 illuminates substrate 108, and substrate 108 casts a shadow onto edge detector 120. Edge detector 120 includes a linear detector array located above substrate 108 and precisely identifies the edge location of the shadow of substrate 108 while stage 110 rotates substrate 108 through 360 degrees. If substrate 108 is nearly circular but not perfectly centered on the stage, the position of the shadow on detector 120 moves slightly as stage 110 rotates substrate .108. The edge detector also detects when the flat or notch in the perimeter of substrate 108 rotates past. Examples of such position detector systems, which are often referred to as pre-aligners, are described in U.S. Pat. No. 4,457,664 of Judell et al., U.S. Pat. No. 5,308,22 of Bacchi et al., U.S. Pat. No. 5,511,934 of Bacchi et al., and U.S. Pat. No. 5,513,948 of Bacchi et al, all of which are incorporated herein by reference. Other types of edge detectors, such as reflective pre-aligners, which are well known in the art, may be used as well.

Processor 112 receives signals from edge detector 120, from which processor 112 determines the position of substrate 108 on stage 110. The processor 112 controls the R-Θ) stage 110 and compensates for any offset of substrate 108 on stage 110. Control of R-Θ) stage 110 and operation of edge detector 120 is discussed in more detail in the U.S. Patent Application entitled "System Using A Polar Coordinate Stage And Continuous Image Rotation To Compensate For Stage Rotation," by R. Buchanan, R. Yarussi, and B. Spady, filed Jul. 10, 1998, having Ser. No. 09/113,484, and having the same assignee as the present disclosure, and which is incorporated herein by reference.

Figure 2:
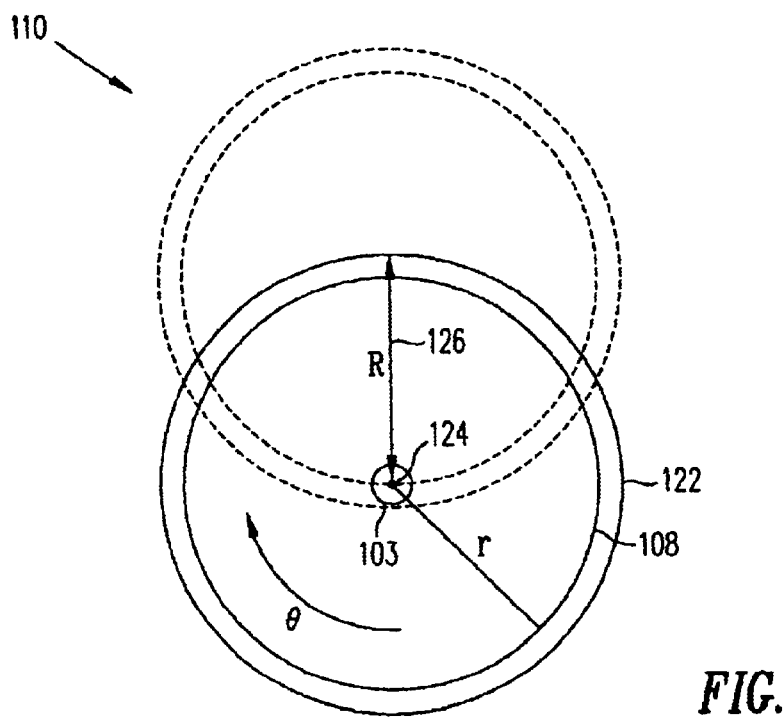
FIG. 2 illustrates the operation of a polar coordinate stage.

FIG. 2 illustrates the operation of R-Θ) stage 110, which is shown holding substrate 108. The R-Θ) stage 110 is a standard polar coordinate stage such as those commercially available from a variety of sources and includes a linear drive that moves a rotatable platform 122 on which sample 108 is mounted. The R-Θ) stage 110 can rotate substrate 108 by 360 degrees about a rotation axis 124 of the platform 122, as indicated by arrow Θ. A rotary encoder monitors the angular orientation Θ of the platform 122 relative to the linear drive direction 126, which is the direction along which the linear drive moves the platform 124. The linear drive direction 126 is also referred to herein as the R coordinate axis 126 of stage 110. A linear encoder monitors the linear position of platform 122 along the R coordinate axis 126. The travel distance r (the radius of the substrate 108) in the direction R is sufficient to center any radial coordinate of substrate 108 in the range from 0 to r under the optical axis 103 of the metrology tool 100, which is coincident with rotation axis 124. Platform 122 rotates about rotation axis 124 to place any angular coordinate of substrate 108 under the optical axis 103.

The R-Θ stage 110 requires rotation of substrate 108 to align particular points on substrate 108 with the optical axis 103 of spectrometer 100. Consequently, as substrate 108 is rotated by stage 110 in relation to the optical head of the spectrometer 100, e.g., lens 114 and polarizer 114, the angle between the transmission axis of the polarizer 114 with the lines of the diffraction structure 106 is skewed.

Figure 3:
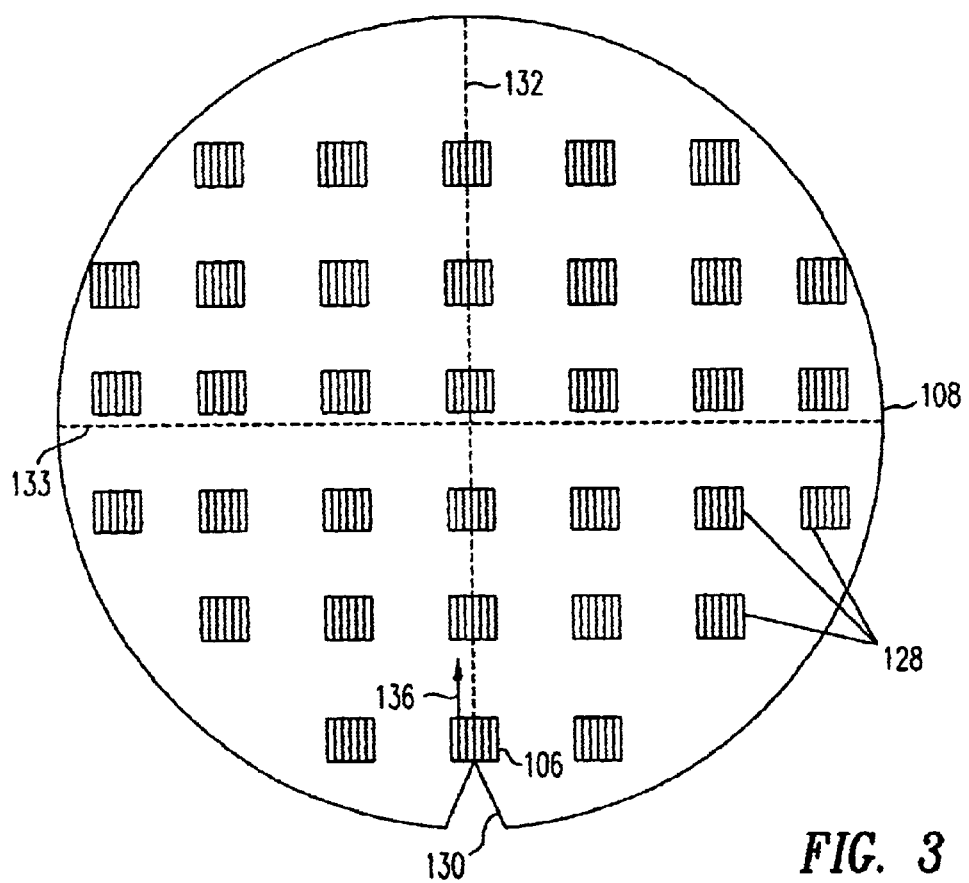
FIG. 3 is a top view of substrate with a plurality of diffraction grating structures.

FIG. 3 is a top view of substrate 108 with a plurality of dies 128 patterned as diffraction grating structures. Substrate 108 conventionally includes a reference mark, such as notch 130 or a flat along the perimeter. A diameter line that passes through notch 130 defines a y-axis 132 and an x-axis 133 is defined as the diameter line orthogonal to the y-axis 132. Typically, at least one of the dies, e.g., diffraction grating 106, will be positioned along the y-axis 132 of the substrate 108. The lines in the diffraction grating structures in each die 128 are typically parallel with each other. Moreover, the lines of the diffraction grating structures are typically either parallel with the y-axis 132 or the x-axis 133 of the substrate 108. FIG. 3 shows the diffraction grating axis 136, i.e., the axis of orientation of the lines of diffraction grating 106, i.e., along the TE axis, parallel with the y-axis 132 of substrate 108. If desired, however, the diffraction grating axis 136 may be defined as being perpendicular to the orientation of the lines of diffraction grating 106, i.e., along the TM axis, which is parallel with the x-axis 133 of substrate 108.

Figure 4:
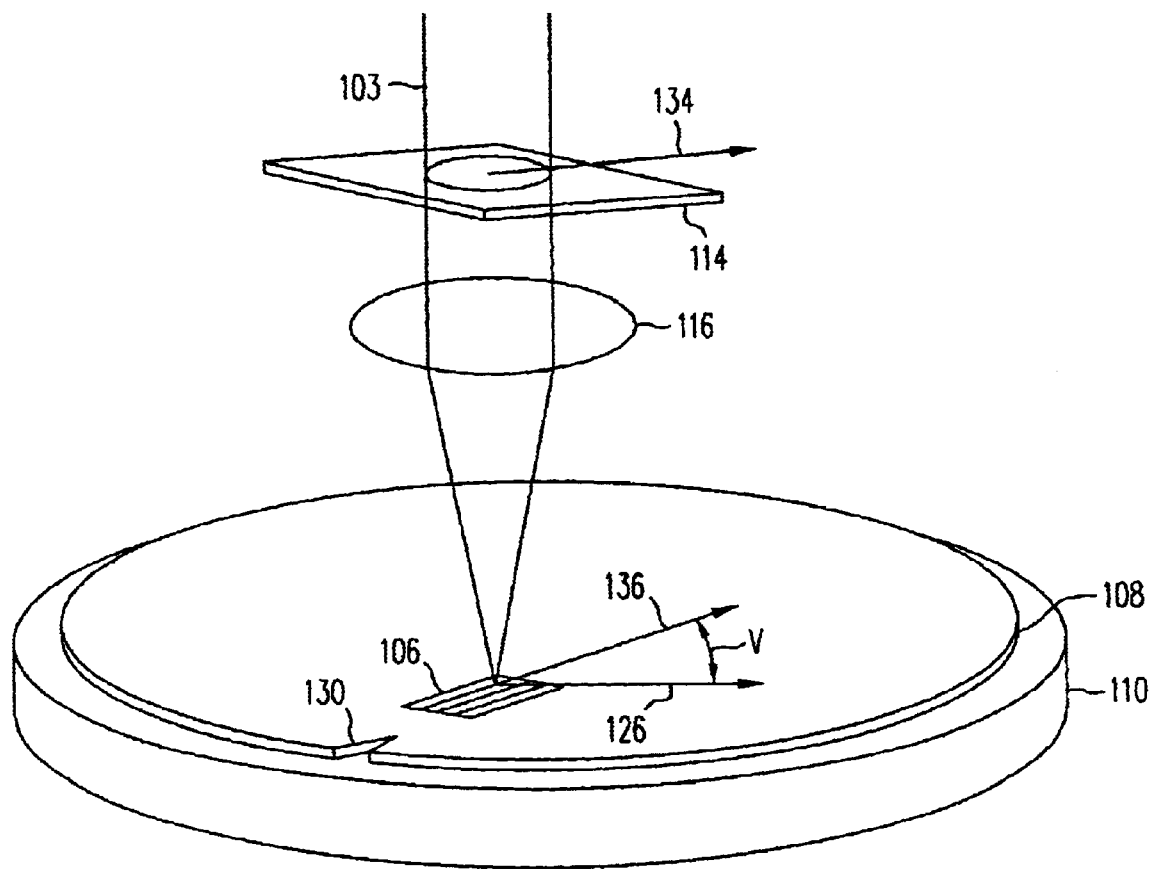
FIG. 4 shows a perspective view of a portion of the spectrometer shown in FIG. 1.

FIG. 4 shows a perspective view of a portion of spectrometer 100, with a beam of light 103 being transmitted through polarizer 114 and focused by lens 116 onto diffraction grating 106. As shown in FIG. 4, substrate 108 is mounted on stage 110 with the diffraction grating axis 136 having an angular orientation relative to the R coordinate axis 126 of stage 110, which is shown projected onto diffraction grating 106. The angular orientation between the diffraction grating axis 136 and the R coordinate axis 126 of stage 110 is referred to herein as the sample offset angle V. In addition, substrate 108 may be loaded onto stage 110 with substrate 108 off-center, i.e., the center of substrate 108 is offset from the rotation axis 124 of stage 110. The amount that substrate 108 is off-center and the sample offset angle V, may be determined using edge detector 120.

Figure 5:
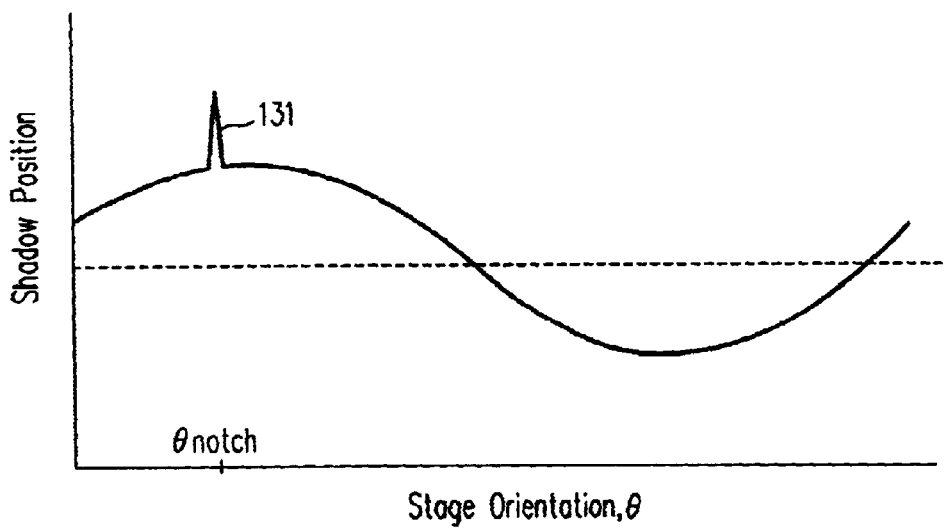
FIG. 5 shows a typical graph of the angular position of a polar coordinate stage versus the position of the shadow of a sample on the stage as produced by an edge detector.

FIG. 5 shows a graph of the angular position of stage 110 versus the position of the shadow of sample 108 as produced by edge detector 120 in FIG. 1. When the substrate 108 is off-center on the stage 110, the position of the shadow of sample 108 generally follows a sinusoidal curve except where the notch 130 causes a spike 131 in the sinusoid. The offset of the center of sample 108 from the rotation axis 124 of stage 110 is a vector having a direction identified from maxima/minima of the sinusoidal curve and a magnitude of half the amplitude of the sinusoidal curve. Known statistical analysis techniques can be applied to the shadow position measurements (neglecting the spike) to determine the offset from center. The y-axis 132 of substrate 108 is found from the position of spike 131 and the calculated center of substrate 108. From the y-axis 132, which is parallel (or perpendicular) to the diffraction grating axis 136, and the known position of the R coordinate axis 126 of stage 110, the sample offset angle V can be determined. For more information relating to the use of edge detector 120 and control of stage 110, see U.S. patent application Ser. No. 09/113,484, which is incorporated herein by reference.

Alternatively, the sample offset angle V may be determined using a metrology device that uses photodetectors to detect, e.g., the −1 and 1 diffracted orders of light diffracted from the diffraction grating 106. The −1 and 1 diffracted orders are diffracted in a direction perpendicular to the lines of the diffraction grating, i.e., along TM axis, and thus, by detecting the −1 and 1 diffracted orders, the orientation of the lines of the diffraction grating may be determined. For more information relating to determining the orientation of the lines of the diffraction grating using a metrology device, see U.S. Patent Application entitled "Determination of the Orientation of Lines of Diffraction Grating," filed Apr. 20, 2001, having Ser. No. 09/839,899, by P. Rovira and R. Webb, which is co-filed, having the same assignee as the present disclosure, and which is incorporated herein by reference. Measuring the −1 and 1 diffracted orders may be particularly advantageous if the diffraction grating orientation differs from the y or x-axes 132, 133 of the substrate 110, or if the calibration procedure is being performed on a diffraction grating that is not positioned on the y or x-axes 132, 133 of the substrate 110.

FIG. 4 also shows the transmission axis of polarizer 114 in its home position as arrow 134. While polarizer 114 is in its home position, the transmission axis 134 of polarizer 114 may not be aligned with the R coordinate axis 126 of the stage 110. The angle between the polarizer transmission axis 134 in its home position and the axis of motion of the stage 110, e.g., the R coordinate axis 126, is defined as the system offset angle φ.

Figure 6:
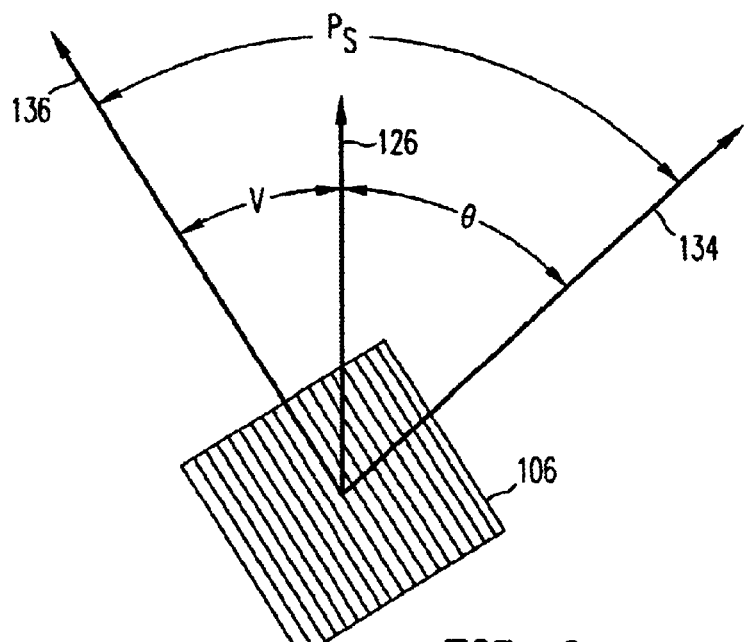
FIG. 6 shows a top view of a diffraction grating with the R coordinate axis of the stage upon which it is mounted and the polarizer transmission axis shown projected onto the diffraction grating.

FIG. 6 shows a top view of diffraction grating 106 with the R coordinate axis 126 of stage 110 and the transmission axis 134 of polarizer 114 shown projected onto diffraction grating 106. As can be seen in FIG. 6:

$$P_S = V + \phi, \qquad \text{eq. 2}$$

where $P_S$ is the polarizer offset angle, defined as the angle between the polarizer transmission axis 134 in its home position and the diffraction grating axis 136, V is the sample offset angle, defined as the angle between the diffraction grating axis 136 and the R coordinate axis 126, and φ is the system offset angle, defined as the angle between the R coordinate axis 126 and the polarizer transmission axis 134 in its home position. Because the system offset angle φ is between the R coordinate axis 126 of the stage 110 and the transmission axis 134 of the polarizer 114 in its home position, φ is a constant for the system, i.e., φ remains the same when new substrates are loaded into the system. The sample offset angle V, however, will vary depending on the precise positioning of substrate 108 on stage 110, and thus, may change for each newly loaded substrate. Accordingly, the polarizer offset angle $P_S$, which is the system offset angle φ (a constant) plus the sample offset angle V (a variable), will change for each newly loaded substrate. Once the system offset angle φ is determined for device, the polarizer offset angle $P_S$ may be quickly and easily determined by measuring the sample offset angle V and summing the sample offset angle V with the known system offset angle φ.

From equation 1, it can be seen that $R_{TE} = R(P_S)$. Combining equation 1 and equation 2, $R_{TE} = R(V+\phi)$, and $R_{Tm} = R(V+\phi \pm 90 \text{ degrees})$. Accordingly, the reflectance $R_{TE}$ or $R_{TM}$ can be measured for any die on any substrate, without need of recalibration of $P_S$, by measuring the sample offset angle V and rotating the polarizer 114 to V+φ or V+φ±90 degrees. As the stage 110 is rotated to place another diffraction grating under optical axis 103, the polarizer 114 will rotate by the same amount.

Figure 7:
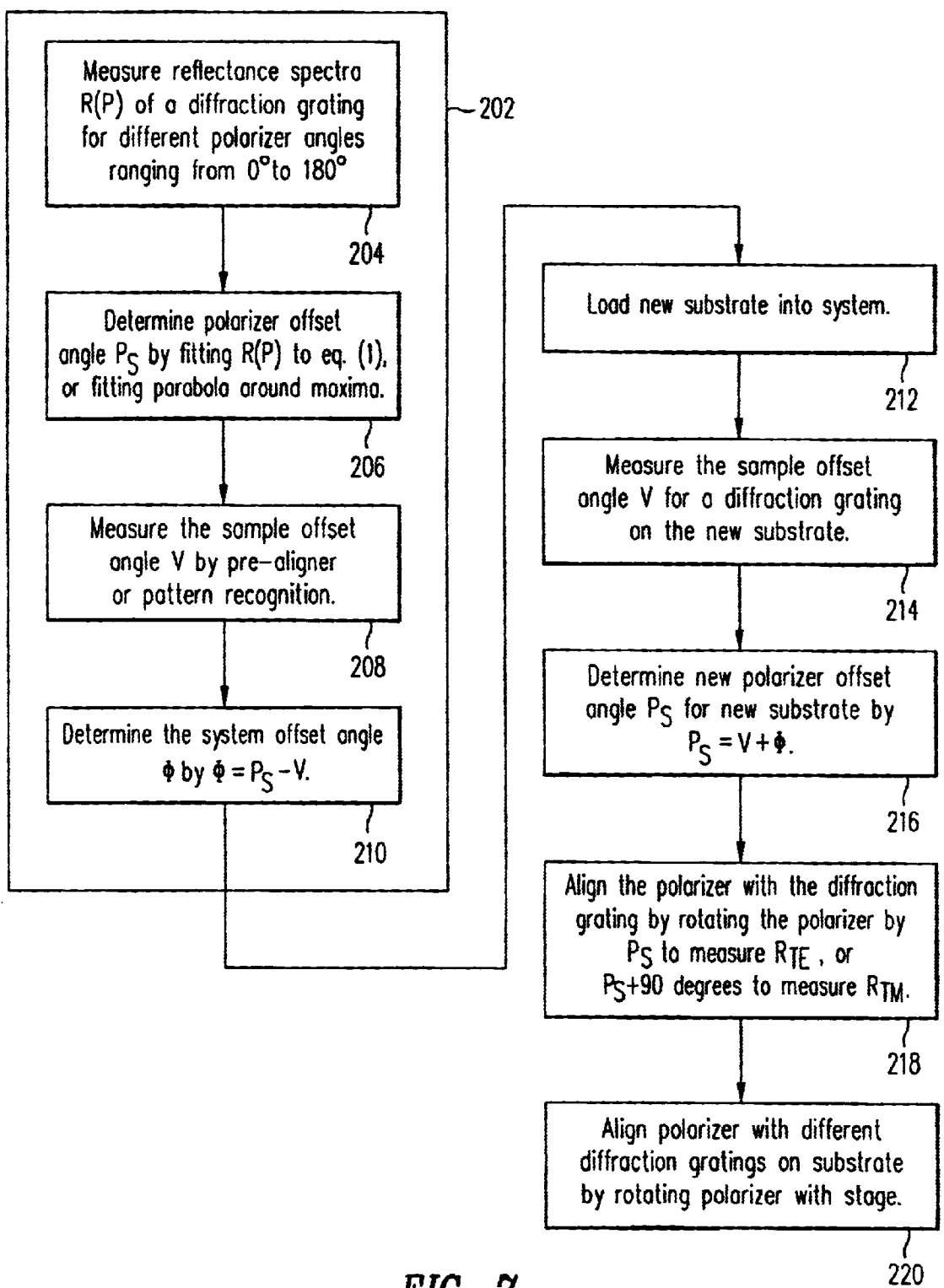
FIG. 7 is a flow diagram illustrating a process for determining the polarizer offset angle $P_S$ in a metrology device and compensating for the polarizer offset angle $P_S$ for each newly loaded substrate.

FIG. 7 is a flow diagram illustrating a process 200 for determining the polarizer offset angle $P_S$ in a metrology device, such as spectrometer 100 and compensating for the polarizer offset angle $P_S$ for each newly loaded substrate. Initially, the system offset angle φ between the polarizer transmission axis 134 and the R coordinate axis 126 is determined (block 202). In accordance with an embodiment of the present invention, the system offset angle φ is determined by first loading a sample, e.g., diffraction grating 106 on substrate 108, into the metrology tool and measuring the reflectance spectra R(P) of a sample at different polarizer angles, e.g., ranging from 0 to 90 degrees or 0 to 180 degrees (block 204). The measured reflectance spectra R(P) may be performed, for example, in 5 to 10 degrees intervals.

Figure 8:
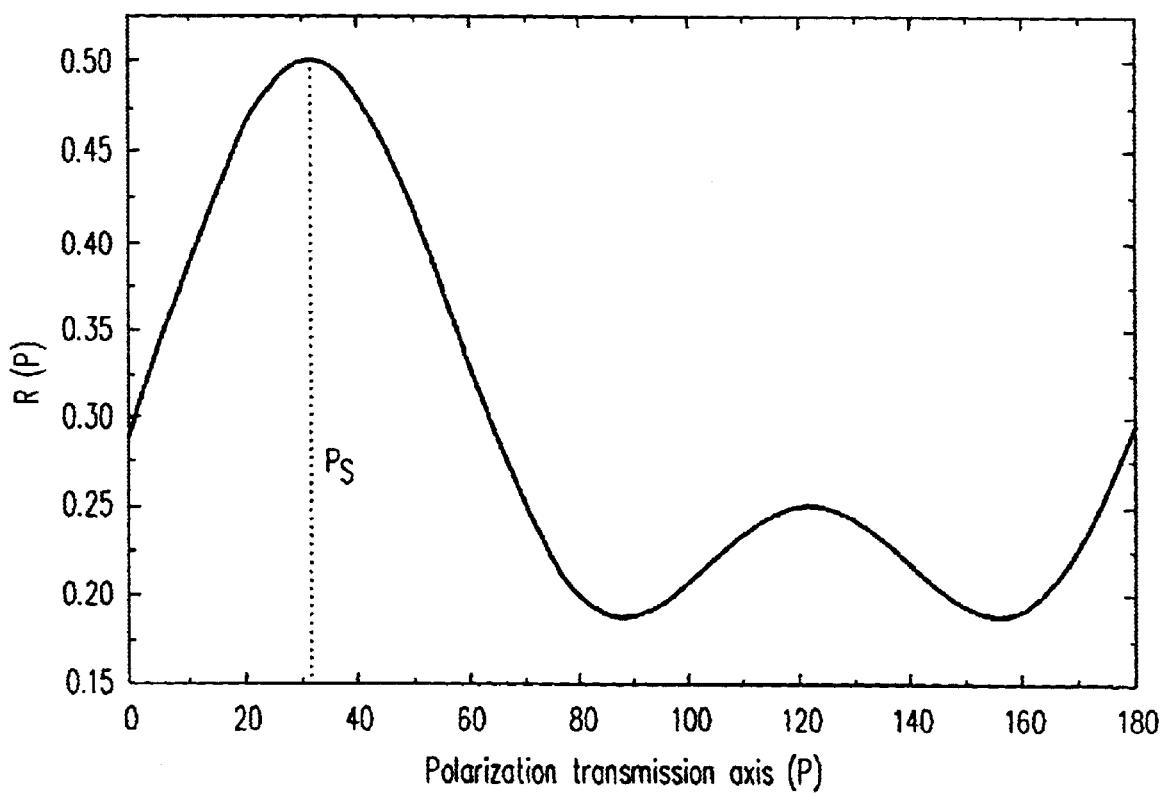
FIG. 8 shows a simulation of the measured reflectance spectra R(P) for a given wavelength as a function of the angle of the polarizer transmission axis.

The measured reflectance spectra R(P) is then fit to equation 1 to determine the polarizer offset angle $P_S$ between the polarization transmission axis 134 and the diffraction grating axis 136 (block 206). An appropriate fitting routine or a Fourier transform approach may be used, such as that described in U.S. patent application Ser. No. 09/670,000, which is incorporated herein by reference. FIG. 8 shows a simulation of the measured reflectance spectra R(P) for a given wavelength as a function of the angle of the polarizer transmission axis, where the polarizer offset angle $P_S$ is shown as approximately 31 degrees.

Another approach to determine the polarizer offset angle $P_S$ may be seen by expanding equation 1 in Taylor series around the polarizer offset angle $P_S$, which indicates a parabolic dependence of the reflectance in $P-P_S$. Thus, the polarizer offset angle $P_S$ may be determined by consecutively measuring a few spectra with the polarization angle varying close to an approximated angle $P_S$, and then fitting a parabola around the maxima of R(P) (block 206) where the maximum is the polarizer offset angle $P_S$.

The sample offset angle V between the diffraction grating axis 136 and the R coordinate axis 126 is then measured (block 208) for the substrate. The sample offset angle V may be measured as described above using edge detector 120 as described in U.S. patent application Ser. No. 09/113,484 or using a metrology device for determining the orientation of the lines of a diffraction grating such as that described in the U.S. Patent Application entitled "Determination of the Orientation of Lines of Diffraction Grating," filed Apr. 20, 2001, having Ser. No. 09/839,899, by P. Rovira and R. Webb, both of which are incorporated herein by reference.

With the polarizer offset angle $P_S$ determined from block 206 and the sample offset angle V measured from block 208, the system offset angle φ for the metrology device can be determined by subtracting the sample offset angle V from the polarizer offset angle $P_S$, i.e., φ=$P_S$−V (block 210).

Other methods of determining the system offset angle φ may also be used. For Example, the system offset angle φ may be physically measured. Alternatively, the system offset angle φ may be determined to be non-zero without identifying the actual angle of φ, i.e., it may be determined that the transmission axis of the polarizer in its home position is not aligned with the axis of motion of the stage without knowing the precise angle between the two. The home position of the polarizer 114 can then be rotated relative to the R coordinate axis 126 to set the system offset angle φ equal to zero, i.e., the home position of the polarizer 114 is rotated until the transmission axis of the polarizer is aligned with the axis of motion of the stage. Thus, the system offset angle φ is determined to be zero.

The metrology system may then be calibrated for each new substrate loaded into the system by measuring the sample offset angle V and rotating the polarizer 114 to compensate for the polarizer offset angle $P_S$. Once the new substrate is loaded into the system (block 212), the sample offset angle V for the new substrate must be measured (block 214) as described above.

Using the sample offset angle V for the new substrate and the system offset angle φ determined in block 202, the polarizer offset angle $P_S$ is determined for the newly loaded substrate by $P_S$=V+φ (block 216). Thus, advantageously, the polarizer offset angle $P_S$ can be determined for a newly loaded substrate, in accordance with the present invention, without using the time consuming conventional measurement of the reflectance spectra R(P) of a sample at different polarizer angles followed by, e.g., fitting the data to equation 1 to determine $P_S$.

With the polarizer offset angle $P_S$ determined for the new substrate, the transmission axis of polarizer 114 is aligned with the diffraction grating by rotating the polarizer 114 by an appropriate amount (block 218). For example, polarizer 114 may be rotated by $P_S$ to measure $R_{TE}$ or by $P_S$±90 degrees to measure $R_{TM}$. Of course, if the diffraction grating axis 136 is defined as being parallel to the TM axis of the diffraction grating 106, instead of the TE axis, polarizer 114 is rotated by $P_S$ to measure $R_{TM}$ or by $P_S$±90 degrees to measure $R_{TE}$.

When a new diffraction grating on the same substrate, but at a different angular orientation, is to be measured, the stage 110 must be rotated as described above in reference to FIG. 3. The polarizer 114 is aligned with the new diffraction grating by rotating the polarizer 114 by the same amount as stage 110 (block 220). When a new substrate is loaded into the system the process returns to block 212.

In one embodiment of the present invention, the metrology device is calibrated after block 210 by rotating polarizer 114 by the system offset angle φ, which becomes the new home position for polarizer 114. Thus, the new system offset angle φ is equal to zero. This may be performed, e.g., by the manufacturer of the metrology device. Consequently, for any new substrate loaded onto the metrology device, the polarizer offset angle $P_S$ will be equal to the sample offset angle V, i.e., $P_S$ V+φ=V+0. Thus, the polarizer is rotated by $P_S$=V in block 218, e.g., by the user. In another embodiment of the present invention, the home position of polarizer 114 is not reset. Accordingly, for any new substrate loaded onto the metrology device, the polarizer 114 is rotated by the system offset angle φ plus the sample offset angle V.

It should be understood that the present invention may be used with other metrology devices as well, such as an ellipsometer with a rotatable polarizer. For example, it is desirable to align the polarizer transmission axis of an ellipsometer with the lines of the diffraction grating to be measured.

It should be understood that the foregoing description is only illustrative of the invention. Various alternatives and modifications can be devised by those skilled in the art without departing from the invention. For instance, while the present invention is described in terms of a normal incidence polarized reflectance spectrometer, the present invention may be used to align and calibrate other metrology devices, such as an ellipsometer, as well. Further, the present invention may be used with a device that uses a conventional x, y stage, where the R coordinate axis 126 is replaced with the axis of motion, either the x or y axis, of the x, y stage. Because the x, y stage does not rotate the substrate, block 220 of process 200 is not necessary. Moreover, it should be understood that the present invention may be performed by compensating for the polarizer offset angle may rotating the R coordinate axis 126 and/or the diffraction grating axis 136 instead of the polarizer transmission axis at its home position 134. Thus, for example, the sample offset angle V may be compensated for by rotating the sample 108 relative to stage 110 until the diffraction grating axis 136 is aligned with the R coordinate axis 124, thereby making the sample offset angle V equal to zero. Accordingly, the present invention is intended to embrace all such alternatives, modifications and variances that fall within the scope of the appended claims.

What is claimed is:

1. A method of calibrating a metrology device for measuring a sample on a substrate, said metrology device having a rotatable polarizer and a positioning stage for positioning said sample for measurement, said method comprising:

determining the system offset angle between the axis of polarization of said rotatable polarizer and an axis of motion of said positioning stage;

loading a substrate with a sample onto said positioning stage;

measuring the sample offset angle between said axis of motion of said positioning stage and the axis of orientation of said sample; and rotating said rotatable polarizer to compensate for said system offset angle and said sample offset angle.

2. The method of claim 1, wherein said sample is a diffraction grating.

3. The method of claim 1, wherein said rotating said rotatable polarizer comprises:

rotating said rotatable polarizer a first angle to compensate for said system offset angle; and rotating said rotatable polarizer a second angle to compensate for said sample offset angle.

4. The method of claim 3, wherein said rotating said rotatable polarizer a first angle and said rotating said rotatable polarizer a second angle are performed continuously.

5. The method of claim 3, wherein said rotating said rotatable polarizer a first angle is performed prior to said rotating said rotatable polarizer a second angle.

6. The method of claim 3, wherein said first angle is equal to said system offset angle and said second angle is equal to said sample offset angle.

7. The method of claim 3, wherein the sum of said first angle and said second angle is equal to the sum of said system offset angle and said sample offset angle plus or minus 90 degrees.

8. The method of claim 1, said method further comprising:

determining the polarizer offset angle between said axis of polarization of said rotatable polarizer and said axis of orientation of said sample by summing said system offset angle and said sample offset angle;

wherein said rotatable polarizer is rotated by an angle equal to the sum of said system offset angle and said sample offset angle.

9. The method of claim 1, said method further comprising:

determining the polarizer offset angle between said axis of polarization of said rotatable polarizer and said axis of orientation of said sample by summing said system offset angle and said sample offset angle;

wherein said rotatable polarizer is rotated by an angle equal to the sum of said system offset angle and said sample offset angle plus or minus 90 degrees.

10. The method of claim 1, wherein determining the system offset angle between the axis of polarization of said rotatable polarizer and an axis of motion of said positioning stage comprises:

loading a calibration substrate with a diffraction grating onto said positioning stage;

determining the polarizer offset angle between said axis of polarization of said rotatable polarizer and an axis of orientation of a diffraction grating on said calibration substrate;

measuring the sample offset angle between said axis of motion of said positioning stage and the axis of orientation of said diffraction grating on said calibration substrate; and determining the system offset angle by subtracting said sample offset angle from said polarizer offset angle.

11. The method of claim 10, wherein said metrology device is a normal incidence polarized reflectance spectrometer, said sample is a diffraction grating, and said determining the polarizer offset angle between said axis of polarization of said rotatable polarizer and an axis of orientation of a diffraction grating on a substrate, comprises:

measuring reflectance spectra of said diffraction grating on said substrate for a plurality of polarizer angles; and determining the polarizer offset angle from said measured reflectance spectra.

12. The method of claim 1, wherein said positioning stage is a polar coordinate stage and said axis of motion of said positioning stage is the R coordinate axis of said positioning stage.

13. The method of claim 1, further comprising:

unloading said substrate from said positioning stage;

loading a second substrate with a sample onto said positioning stage;

measuring a second sample offset angle between said axis of motion of said positioning stage and the axis of orientation of said sample on said second substrate; and rotating said rotatable polarizer to compensate for said system offset angle and said second sample offset angle.

14. A method of calibrating a normal incidence polarized reflectance spectrometer for measuring a diffraction grating on a substrate, said normal incidence polarized reflectance spectrometer having a rotatable polarizer and a positioning stage for positioning said diffraction grating for measurement, said method comprising:

loading a calibration substrate with a diffraction grating onto said positioning stage;

determining the polarizer offset angle between said axis of polarization of said rotatable polarizer and an axis of orientation of a diffraction grating on said calibration substrate;

measuring the sample offset angle between said axis of motion of said positioning stage and the axis of orientation of said diffraction grating on said calibration substrate;

determining the system offset angle of said normal incidence polarized reflectance spectrometer by subtracting said sample offset angle from said polarizer offset angle;

loading a second substrate with a diffraction grating to be measured onto said positioning stage;

measuring a second sample offset angle between said axis of motion of said positioning stage and the axis of orientation of said diffraction grating on said second substrate; and rotating said rotatable polarizer to compensate for said system offset angle and said second sample offset angle.

15. The method of claim 14, wherein said determining the polarizer offset angle between said axis of polarization of said rotatable polarizer and an axis of orientation of a diffraction grating on said calibration substrate, comprises:

measuring reflectance spectra of said diffraction grating on said calibration substrate for a plurality of polarizer angles; and determining the polarizer offset angle from said measured reflectance spectra.

16. The method of claim 14, wherein said rotatable polarizer is rotated to compensate for said system offset angle before said second substrate is loaded onto said positioning stage.

17. The method of claim 14, wherein said rotatable polarizer is rotated by an amount equal to said system offset angle and said second sample offset angle.

18. The method of claim 14, wherein said rotatable polarizer is rotated by an amount equal to said system offset angle and said second sample offset angle plus or minus 90 degrees.

19. A method of calibrating a metrology system by aligning a transmission axis of a rotatable polarizer with an axis of orientation of any diffraction grating to be measured, said system having a positioning stage with an axis of motion, said method comprising:

determine the system offset angle between said transmission axis of said rotatable polarizer and said axis of motion of said positioning stage;

measuring the sample offset angle between said axis of motion of said positioning stage and the axis of orientation of a first diffraction grating on a first substrate to be measured; and rotating said rotatable polarizer by said system offset angle and said sample offset angle.

20. The method of claim 19, wherein said axis of orientation of said diffraction grating is one of the TM axis and the TE axis.

21. The method of claim 19, further comprising:

rotating said positioning stage by a first angle to position a second diffraction grating on said first substrate for measurement;

rotating said rotatable polarizer by said first angle to align said transmission axis of said rotatable polarizer with the axis of orientation of said second diffraction grating.

22. The method of claim 19, further comprising:

unloading said first substrate from said positioning stage;

loading a second substrate on said positioning stage, said second substrate having a first diffraction grating to be measured;

measuring a second sample offset angle between said axis of motion of said positioning stage and the axis of orientation of said first diffraction grating on said second substrate to be measured; and rotating said rotatable polarizer by said system offset angle and said second sample offset angle.

23. A method of calibrating a metrology device to compensate for a polarizer offset angle between the transmission axis of a rotatable polarizer and an axis of orientation of any diffraction grating to be measured, said metrology device having a positioning stage for positioning a diffraction grating for measurement, said metrology device having a system offset angle between the axis of polarization of said rotatable polarizer and an axis of motion of said positioning stage, wherein said system offset angle is adjusted to be zero, said method comprising:

loading a substrate with a diffraction grating onto said positioning stage;

measuring the sample offset angle between said axis of motion of said positioning stage and the axis of orientation of said diffraction grating; and rotating said rotatable polarizer to compensate for said sample offset angle thereby aligning said transmission axis of said rotatable polarizer and said axis of orientation of said diffraction grating.

24. The method of claim 23, wherein said rotatable polarizer is rotated by said sample offset angle.

25. The method of claim 23, wherein said rotatable polarizer is rotated by said sample offset angle plus or minus 90 degrees.

26. The method of claim 23, further comprising:

rotating said positioning stage by a first angle to position a second diffraction grating on said substrate for measurement;

rotating said rotatable polarizer by said first angle to align said transmission axis of said rotatable polarizer with the axis of orientation of said second diffraction grating.

27. The method of claim 23, further comprising:

unloading said substrate from said positioning stage;

loading a second substrate on said positioning stage, said second substrate having a first diffraction grating to be measured;

measuring a second sample offset angle between said axis of motion of said positioning stage and the axis of orientation of said first diffraction grating on said second substrate to be measured; and rotating said rotatable polarizer to compensate for said second sample offset thereby aligning said transmission axis of said rotatable polarizer and said axis of orientation of said first diffraction grating on said second substrate.

* * * * *